L. A. ZÖHE.
APPARATUS FOR TREATING GAS.
APPLICATION FILED MAY 9, 1910. RENEWED JUNE 15, 1915.
1,168,451.
Patented Jan. 18, 1916.
2 SHEETS—SHEET 2.
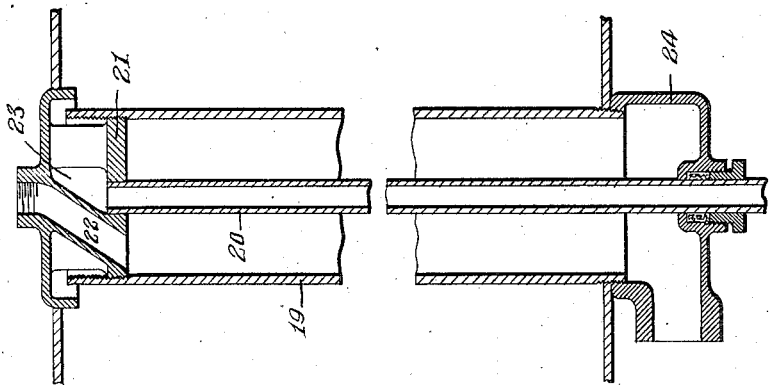
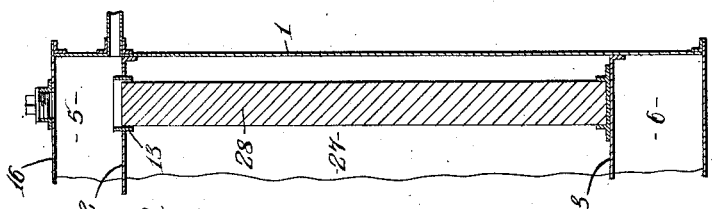
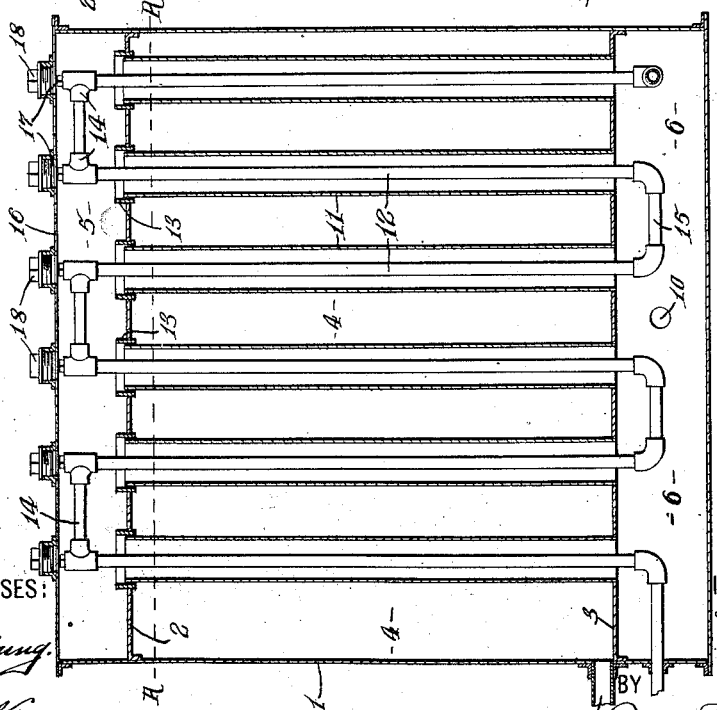

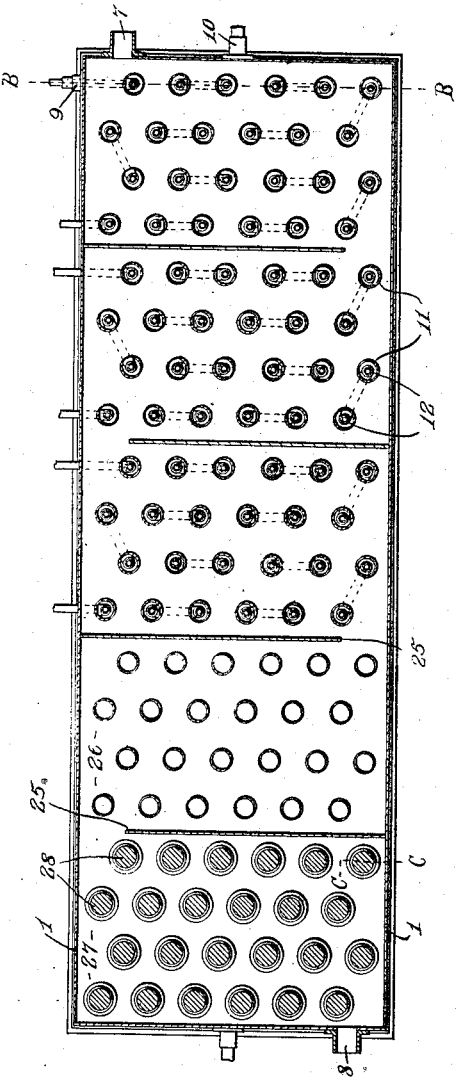

UNITED STATES PATENT OFFICE.

LUDWIG ALVINE ZÖHE, OF SYRACUSE, NEW YORK.

APPARATUS FOR TREATING GAS.

1,168,451.  Specification of Letters Patent.  Patented Jan. 18, 1916.

Application filed May 9, 1910, Serial No. 560,197. Renewed June 15, 1915. Serial No. 34,314.

*To all whom it may concern:*

Be it known that I, LUDWIG ALVINE ZÖHE, of Syracuse, in the county of Onondaga and State of New York, have invented a new and useful Apparatus for Treating Gas, of which the following is a specification.

My invention has for its object the production of means for treating gases, particularly applicable for cooling and scrubbing gases, and it consists in the combinations and constructions hereinafter set forth and claimed.

In describing my invention reference is had to the accompanying drawing in which like characters designate corresponding parts in all the views.

Figures 1 and 2 are horizontal and vertical sectional views of one form of this apparatus, Fig. 1 being taken on line "A—A" Fig. 2, and Fig. 2 being taken on line "B—B" Fig. 1. Fig. 3 is a sectional view on line "C—C" Fig. 1. Fig. 4 is a detail view of another form of my apparatus.

This apparatus comprises a receiver for the gas to be treated, means for forming a constantly changing surface with which the gas comes in contact, and also means for controlling the temperature of such surface or maintaining the same at a substantially uniform temperature. In some instances, however, the scrubbing feature may be omitted and the gas brought in contact with the outer surface of the conduit conveying the temperature controlling medium, also in some cases the temperature regulating means may be omitted.

In the illustrated embodiment of my invention, 1 as a casing having horizontal partitions, 2 and 3 dividing the interior of the casing 1 into a receiver 4 for the gas, an upper chamber 5 and a lower chamber 6, the receiver having suitable openings 7 and 8 for the inlet and the outlet of the gas and also an outlet 9 for the liquor formed by the cooling liquid and the matter absorbed thereby from the gas. The lower chamber 6 serves as a supply chamber for the liquid as water or oil with which the gas is to be treated, or cooled and scrubbed, or enriched, and such chamber is provided with an inlet 10 for the liquid, and a suitable pump not shown is provided for circulating the liquid.

11 is a set of upwardly extending or upright conduits, and 12 is an additional set of conduits within the conduits 11, one set of conduits communicating at their lower ends with the chamber 6 for receiving the liquid or water therefrom and communicating with the interior of the receiver in order to discharge such liquid on the peripheries of the outer conduits. The other set of conduits are disconnected from the interior of the receiver and are connected in series and serve to convey a cooling medium.

As seen in Fig. 2, the outer conduits 11 communicate with the chamber 6 and extend through the receiver 4 and communicate at their upper ends with the chamber 5, the partition 2 being provided with collars 13 encircling the upper ends of the conduits 11 and of greater diameter than said conduits 11 in order to form passages for the liquid emerging from the upper ends of said conduits 11 and permitting said liquid to run down the peripheries of the same. The conduits 12 are, as seen in Fig. 2, located concentric with the conduits 11 and are connected at their upper and lower ends by couplings 14 and 15 so that the cooling medium passes up one conduit 12 and down another. In order to permit access to the conduits 12, the top wall 16 of the casing is provided with suitable passages 17 alined with the conduits 12 and normally closed by suitable means as threaded plugs 18. However, as seen in Fig. 4, the cooling medium may be conveyed by the outer conduit 19 and the cooling and scrubbing liquid by the inner conduit 20. In this construction each outer conduit 19 is provided with a plug 21 at its upper end, this plug being formed with a passage 22 communicating with the interior of the conduit 19 and adapted to communicate with a suitable coupling not shown which conveys the cooling medium to the next conduit 19. The plug 21 is also provided with a transfer passage 23 around the passage 22, the transfer passage 23 communicating with the receiver for the gas in order to permit the liquid, as water passing through the conduit 20, to flow over the end of the outer conduit 19 and down the periphery thereof. A suitable coupling 24 is connected to the lower end of the conduit 19, such coupling establishing communication with another conduit 19. The lower end of said conduit 20 communicates with a source of supply.

In Fig. 4, the upper end of the outer conduit may be closed and the tube filled with a liquid, which is cooled by the refrigerating medium in the inner conduit and which acts to absorb heat from the wall of the outer conduit, the periphery of which is engaged by the gas.

Usually the receiver is divided by several transverse partitions 25 (Fig. 1) into a plurality of compartments, said partitions being so arranged that the gases take a tortuous path through the receiver. As the gas passes through some of the compartments it becomes sufficiently cooled by contacting the changing surfaces formed by the water or other liquid on the periheries of the conduits 11 or 19 so that it is scrubbed and cleaned only. Therefore in the compartments through which the gas passes last in its treatment, as the compartments 26 and 27, the conduits containing the cooling medium are omitted and if desired in the compartment 27 instead of passing the water through conduits, it may flow from the upper chamber 5 down the peripheries of posts or upright members 28, Fig. 3.

In operation the gas is passed in at 7 in the receiver and passes through the receiver from compartment to compartment, coming in contact with the changing surfaces formed by the water on the peripheries of the outer conduits 11 or 19, the water being maintained at low temperature by the cooling medium passing through the conduits 12 or 20.

I claim—

1. In an apparatus for bringing gas in contact with a liquid, a receiver for the gas, a conduit for the liquid, the conduit extending into the receiver and having an outlet from its interior to the periphery thereof over which the liquid runs, and means for controlling the temperature of the liquid within the conduit, substantially as and for the purpose described.

2. In an apparatus for treating gas, a receiver for the gas, an outer conduit within the receiver, and an inner conduit within the outer conduit, one conduit communicating with the interior of the receiver for discharging the liquid on the peripheral surface of the outer conduit, and the other conduit conveying a medium for controlling the temperature of such peripheral surface, substantially as and for the purpose specified.

3. In an apparatus for treating gas, a receiver for the gas, a vertically extending conduit for the liquid with which the gas is to be treated, the conduit having an outlet from its interior to its periphery whereby the liquid may run freely down the periphery of the conduit, and a conduit within the former conduit, substantially as and for the purpose set forth.

4. In an apparatus of the class described a receiver for gas and conduits for liquid, the conduits extending into the receiver and having outlets from their interiors to the peripheries thereof over which the liquid runs, the peripheries being non-absorbent, substantially as and for the purpose described.

5. In an apparatus for treating gas, a receiver for the gas, an outer upwardly extending conduit within the receiver, and an inner conduit within the outer conduit, one conduit communicating with the interior of the receiver for discharging a liquid on the peripheral surface of the outer conduit, and the other conduit conveying a medium for controlling the temperature of the liquid on such peripheral surface, the last-mentioned conduit being disconnected from the receiver, substantially as and for the purpose set forth.

6. In an apparatus for treating gas, a casing, partitions within the casing dividing the same into a receiver for the gas and chambers above and below the receiver, the lower chamber serving as a supply for a liquid for treating the gas, and an upwardly extending conduit extending through the receiver and communicating at its lower end with the lower chamber and at its upper end with the upper chamber, and said upper chamber communicating around the upper end of said conduit with the interior of the receiver, substantially as and for the purpose described.

7. In an apparatus for treating gas, a casing having partitions dividing the same into a receiver for the gas and chambers above and below the receiver, an outer upwardly extending conduit within the chamber, and an inner conduit within the outer conduit, one conduit communicating at its lower end with the lower chamber and serving to convey the liquid from the lower chamber to the upper, and the upper chamber communicating around the upper end of the outer conduit with the interior of the receiver, and the other conduit conveying a medium for controlling the temperature of the liquid passing through the conduit opening into said chambers, the temperature controlling medium conduit being disconnected from the interior of the casing, substantially as and for the purpose specified.

8. In an apparatus for treating gas, a casing having a plurality of partitions dividing the casing into a receiver for the gas and chambers above and below the receiver, a plurality of upwardly extending conduits within the receiver and communicating with the lower chamber and with the upper chamber, the upper chamber communicating around the upper ends of the conduits with the interior of the receiver, said conduits serving to convey a free running liquid from the lower chamber to the upper chamber and down the peripheries of such conduits, substantially as and for the purpose set forth.

9. In an apparatus for treating gas, a receiver for the gas, a supply chamber for a liquid for treating the gas, a set of outer upwardly extending conduits within the receiver, a set of inner conduits, within the outer conduits, one set of conduits communicating with the supply chamber and with the interior of the receiver for discharging the liquid on the peripheries of the outer conduits, and the other set of conduits being connected together in series and being disconnected from the interior of the receiver and serving to convey a medium for controlling the temperature of the liquid on said peripheries, substantially as and for the purpose described.

10. In an apparatus for treating gas, a casing, a partition within the casing dividing the same into a receiver for the gas and a chamber below the receiver for a liquid for treating the gas, a set of outer upwardly extending conduits within the receiver, and a set of inner conduits within the outer conduits, one set of conduits opening at their lower ends into the chamber and communicating at their upper ends with the interior of the receiver for conveying a liquid to the peripheries of the outer conduits, and the other set of conduits being connected in series and serving to convey a medium for controlling the temperature of such liquid, substantially as and for the purpose specified.

11. In an apparatus for treating gas, a casing having partitions dividing the same into a receiver for the gas and chambers above and below the receiver, the lower chamber serving as a supply for the liquid for treating the gas, a set of outer upwardly extending conduits within the chamber, and a set of inner conduits within the first set, one set of conduits communicating at their lower ends with the lower chamber and opening at their upper ends into the upper chamber and serving to convey the liquid from the lower chamber to the upper chamber and the upper chamber communicating with the interior of the receiver around the upper ends of the outer conduits, and the other set of conduits being disconnected from the interior of the receiver and the chambers and being connected in series and serving to convey a medium for controlling the temperature of the liquid, substantially as and for the purpose set forth.

In testimony whereof, I have hereunto signed my name in the presence of two attesting witnesses, at Syracuse, in the county of Onondaga, in the State of New York, this 9th day of Apr., 1910.

LUDWIG ALVINE ZÖHE.

Witnesses:
   GENEVIEVE B. SMITH,
   S. DAVIS.